(12) United States Patent
Lokere et al.

(10) Patent No.: US 7,487,803 B2
(45) Date of Patent: Feb. 10, 2009

(54) FLAT HIGH-TENSILE WIRE AS HOSE REINFORCEMENT

(75) Inventors: Erwin Lokere, Kortrijk (BE); Stijn Vanneste, Ingelmunster (BE)

(73) Assignee: NV Bekaert SA, Zwevegem (BE)

( * ) Notice: Subject to any disclaimer, the term of this patent is extended or adjusted under 35 U.S.C. 154(b) by 273 days.

(21) Appl. No.: 11/596,042

(22) PCT Filed: Apr. 26, 2005

(86) PCT No.: PCT/EP2005/051858

§ 371 (c)(1),
(2), (4) Date: Nov. 9, 2006

(87) PCT Pub. No.: WO2005/108846

PCT Pub. Date: Nov. 17, 2005

(65) Prior Publication Data

US 2008/0047626 A1    Feb. 28, 2008

(30) Foreign Application Priority Data

May 12, 2004    (EP)    ................... 04102060

(51) Int. Cl.
*F16L 11/00*    (2006.01)
(52) U.S. Cl. ................ 138/134; 138/133; 138/127; 428/36.91

(58) Field of Classification Search ................ 138/132, 138/133, 134, 127; 428/36.91
See application file for complete search history.

(56) References Cited

U.S. PATENT DOCUMENTS

| | | | | |
|---|---|---|---|---|
| 4,200,126 A | * | 4/1980 | Fish ........................... | 138/143 |
| 4,241,763 A | * | 12/1980 | Antal et al. .................. | 138/127 |
| 5,630,806 A | * | 5/1997 | Inagaki et al. ............... | 604/524 |
| 6,098,667 A | * | 8/2000 | Odru .......................... | 138/134 |
| 6,192,941 B1 | * | 2/2001 | Mallen-Herrero et al. ... | 138/135 |
| 6,390,141 B1 | | 5/2002 | Fisher et al. | |
| 6,511,462 B1 | * | 1/2003 | Itou et al. ................... | 604/264 |

FOREIGN PATENT DOCUMENTS

| | | |
|---|---|---|
| EP | 0 790 349 B1 | 6/2000 |
| JP | 6-201077 A | 7/1994 |
| JP | 8-187796 A | 7/1996 |

* cited by examiner

*Primary Examiner*—James F Hook
(74) *Attorney, Agent, or Firm*—Foley & Lardner LLP

(57) ABSTRACT

A flexible hose or pipe (42) is reinforced by means of at least one flattened steel wire (10, 20) with natural edges. The steel wire has a thickness-to-width ratio t/w below 0.95, a tensile strength $R_m$ exceeding 3500–2000×d, where d is the diameter of a circle having the same cross-sectional surface and where $R_m$ is expressed in Mpa and a permanent elongation at maximum load $A_g$ of at least 0.70%. The flattening of the steel wire (10, 20) allows to recuperate ductility which has been lost as a result of the drawing until the final tensile strength $R_m$.

6 Claims, 1 Drawing Sheet

Prior art      Invention

FLAT HIGH-TENSILE WIRE AS HOSE REINFORCEMENT

FIELD OF THE INVENTION

The present invention relates to a flexible hose or pipe reinforced by means of at least one steel wire.

BACKGROUND OF THE INVENTION

In the art of flexible hoses or pipes, several attempts have been made to either decrease the diameter of the hose or pipe while keeping the amount of reinforcement equal or to keep the diameter of the hose or pipe constant while increasing the amount of reinforcement. In both cases steel wires or steel cords with higher tensile strengths have been tried. Up to now and in big contrast with rubber tires, however, tests with hoses or pipes having steel cords and steel wires with higher tensile strengths have not been successful. Applying a stress-relieving treatment as disclosed in EP-B1-0 790 349 to the higher tensile steel wires or steel cords, has proved to mitigate the drawbacks of the higher tensile reinforcement in hoses and pipes but, at the same time, has decreased the tensile strength of the steel wires or steel cords.

SUMMARY OF THE INVENTION

It is an object of the present invention to avoid the drawbacks of the prior art.

It is another object of the present invention to provide a high-tensile steel reinforcement in flexible hoses and pipes.

It is a further object of the present invention to decrease the external diameter of flexible hoses and pipes without decreasing the amount of reinforcement.

It is an alternative object of the present invention to increase the amount of reinforcement in a flexible hose or pipe without increasing the external diameter of these hoses or pipes.

According to the invention, there is provided a flexible hose or pipe reinforced by means of at least one flattened steel wire. The steel wire has following features:
- a thickness-to-width ratio t/w below 0.95,
- a tensile strength $R_m$ exceeding 3500−2000×d, where d is the diameter of a circle having the same cross-sectional surface and where $R_m$ is expressed in MPa,
- a permanent elongation at maximum load $A_g$ of at least 0.70%.

As a matter of preferable example, the flattened steel wire has natural edges. The terms "flattened steel wire with natural edges" refer to a flat steel wire, which has been rolled between two rolls: such a steel wire has two flat sides and two rounded edges, which are referred to as natural edges, since no force has been exercised there. The thickness t is the distance between the two flat sides. The width w is the longest cross-sectional distance between the two rounded edges.

It has taken some time to discover the reason for the lack of success of higher tensile wires and cords in hoses and pipes. Initially, the lack of success was attributed to the phenomenon that higher tensile wires are more vulnerable than normal tensile wires to lateral contact forces. While this phenomenon is true, from a general point of view, it is not the reason for the lack of success in flexible hoses and pipes. According to the inventors, the real reason is to be found in the decreasing ductility of higher tensile steel wires and steel cords: the higher the tensile strength, the lower the ductility. The flattening of round steel wires, e.g. by means of cold rolling, increases the ductility substantially while only slightly reducing the tensile strength. This phenomenon, known as such under the name of Bausinger effect, is now applied to higher tensile steel wires for hose and pipe reinforcement.

With a thickness-to-width ratio t/w of below 0.95 a substantial increase in ductility is already noticed. The lower the thickness-to-width ratio t/w, the higher the increase in ductility. So a t/w below 0.90 is better than a t/w below 0.95. Generally, the t/w ratio may range from 0.20 to 0.95, e.g. from 0.30 to 0.85.

Generally, the thickness t may range from 0.15 mm on, e.g. from 0.20 mm on. The width w may range up to 1.50 mm, e.g. up to 1.30 mm.

With respect to tensile strengths, a tensile strength $R_m$ exceeding 3500−2000×d MPa, where d is the diameter of a circle having the same cross-sectional surface, is called a high-tensile strength. A tensile strength $R_m$ exceeding 3900−2000×d MPa is called a super-high-tensile strength.

A tensile strength $R_m$ exceeding 4300−2000×d MPa, is called an ultra-high-tensile strength.

The invention applies both the spiraled hoses and to braided hoses. A braided hose usually has reinforcement wires with a thickness t below 0.45 mm, and a spiraled hose usually has reinforcement wires with a thickness t below 0.75 mm.

The matrix material of the hoses may be rubber, thermoplastic, polyurethane and the like.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION AND OF A COMPARISON WITH PRIOR ART EMBODIMENTS

A prior art round wire has a limitation concerning the efficiently used space. Indeed, the space occupied by a round wire with diameter d is equal to $d^2$ whereas the reinforced area is only $\pi d^2/4$, so the degree of efficiently used space amounts to $\pi/4 = 0.785$.

Figure 1:
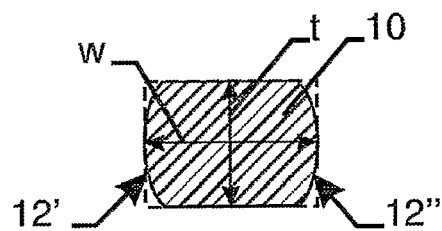
FIG. 1 is a cross-section of a flattened steel wire

The prior art round wire is now compared with a first flattened wire 10 as shown in FIG. 1. Flattened wire 10 has a thickness t of 0.485 mm and a width w of 0.604 mm. So the t/w ratio is equal to 0.803. The surface area of the rectangle in dotted lines is 0.293 mm², while the reinforced area is 0.2462 mm². So the degree of efficiently used space amounts to 0.84, which is greater than in the case of a prior art round wire.

Flattened wire 10 has natural edges 12' and 12", which are the edges formed by rolling a round steel wire between two rolls without obstructing the plastic flow in a direction perpendicular to the action of the two rolls.

Figure 2:
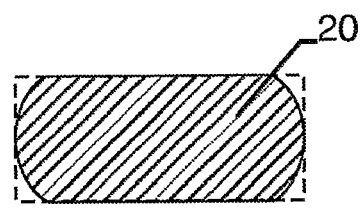
FIG. 2 is a cross-section of another flattened steel wire

The comparison with a prior art round wire is continued with the help of FIG. 2. Flattened wire 20 has a thickness t of 0.310 mm and a width w of 0.853 mm. So the t/w ratio is equal to 0.363. The surface area of the rectangle in dotted lines is 0.26443 mm², while the reinforced area is 0.247 mm². So the degree of efficiently used space amounts to 0.934, which is greater than in the case of a prior art round wire and greater than in the case of FIG. 1. The smaller the t/w ratio, the greater the degree of efficiently used space.

A flattened steel wire may be manufactured as follows. The source material is a wire rod with a steel composition along the following lines: a minimum carbon content of 0.60%, a manganese content ranging between 0.30 and 0.80%, a silicon content ranging between 0.10 and 0.45%, a maximum sulfur content of 0.04%, a maximum phosphorus content of 0.04% and possibly micro-alloying element such as nickel, chromium and vanadium in amounts ranging up to 0.40%.

The wire rod is drawn until a diameter of 0.35 mm. Thereafter, the drawn steel wire is flattened between a pair of rolls.

The degree of drawing, the steel composition, the number (if any) of intermediate heat treatments and the degree of flattening determine the final tensile strength.

Test

Three different degrees of flattening have been applied to a round steel wire of 0.35 mm:

A: 5% flattening until thickness t of 0.333 mm
B: 10% flattening until thickness t of 0.315 mm
C: 14% flattening until thickness t of 0.300 mm.

These three flattening degrees have been applied to three different levels of tensile strength : a normal tensile (NT) strength wire, a high-tensile (HT) strength wire and an ultra-high tensile (UHT) strength wire.

The permanent elongation at maximum load $A_g$ has been measured for all cases and has been compared with the $A_g$ value of comparable round wires.

Table 1 hereunder summarizes the results.

TABLE 1

| Degree of flattening ↓ | Normal tensile NT ($A_g$ in %) | High-tensile HT ($A_g$ in %) | Ultra high-tensile UHT ($A_g$ in %) |
|---|---|---|---|
| A: 5% | 1.13 | 0.90 | 0.66 |
| B: 10% | 1.22 | 0.98 | 0.77 |
| C: 14% | 1.38 | 1.19 | 1.00 |
| Ref: round wire | 0.90 | 0.70 | 0.65 |

The data in bold refer to embodiments of the invention.

Figure 3:
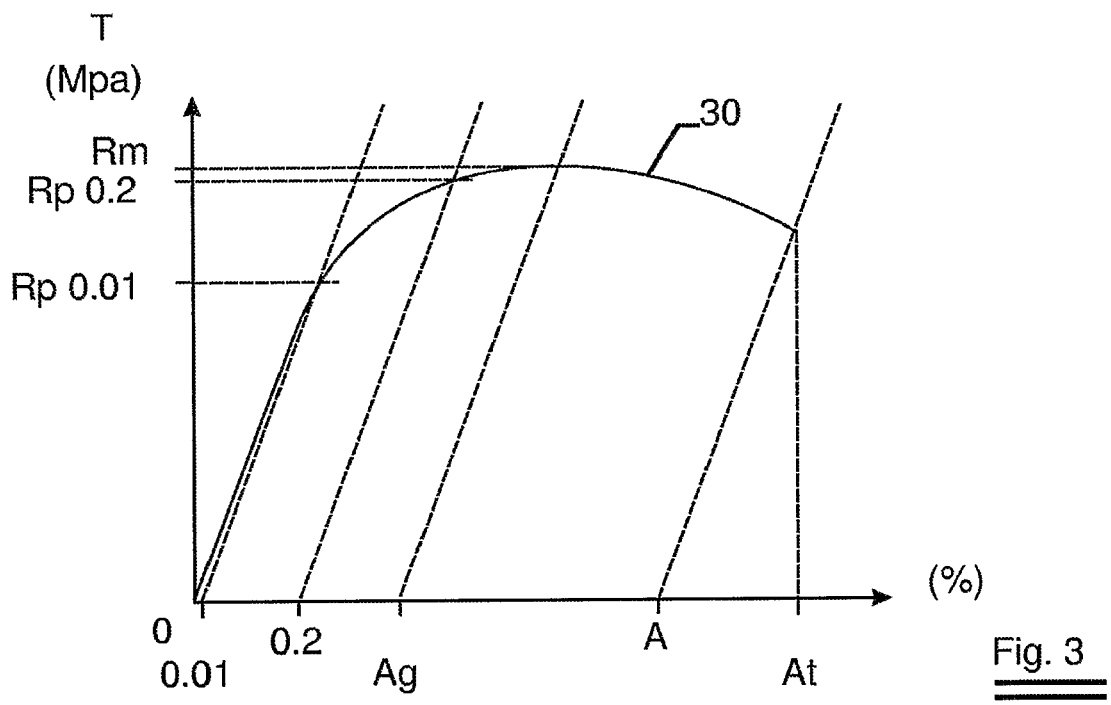
FIG. 3 is a tensile diagram explaining the different elongations.

The permanent elongation at maximum load $A_g$ must be distinguished from other elongations such as the total elongation at fracture $A_t$. In order to clarify this, FIG. 3 gives a schematic drawing of a tensile strength—elongation curve 30 with various parameters that can be determined with the help of curve 30.

Abscissa is the elongation ∈ (%) and ordinate is the strength T (MPa or MegaPascal). Following parameters can be derived:

Rm (MPa) is the tensile strength
$R_{p\,0,2}$ (MPa) is the yield strength at 0.2% permanent elongation
$R_{p\,0,01}$ (Mpa) is the yield strength at 0.01% permanent elongation
$A_g$ (%) is the permanent elongation at maximum load
A (%) is the percentage elongation after fracture
$A_t$ (%) is the percentage total elongation at fracture
E (MPa) is the modulus of elasticity.

So the value of $A_g$ is smaller than the value of $A_t$.

Referring back to Table 1, it is known and the results in the Table confirm this, that an increasing tensile strength lowers the permanent elongation $A_g$ at maximum load. This is the reason why simply increasing the tensile strength has been unsuccessful up to now in the reinforcement of hoses. Flattening round steel wires, however, lead to higher values of the permanent elongation $A_t$, due to the already mentioned Bausinger effect. So the combination of increasing the tensile strength $R_m$ together with the flattening of steel wires enables an efficient and improved reinforcement of hoses.

A hose according to the invention may be manufactured as follows. An inner liner is extruded around a mandrel. A reinforcing layer of flattened high-tensile steel wires is made around the inner layer. This can be done either by means of a braiding machine or by means of a spiraling machine. The reinforcing layer is possibly followed by one or more intermediate layers and other reinforcing layers. A hose may comprise from one to four or even more reinforcing layers. The radially outer reinforcing layer is extruded by means of a cover layer.

Figure 4:
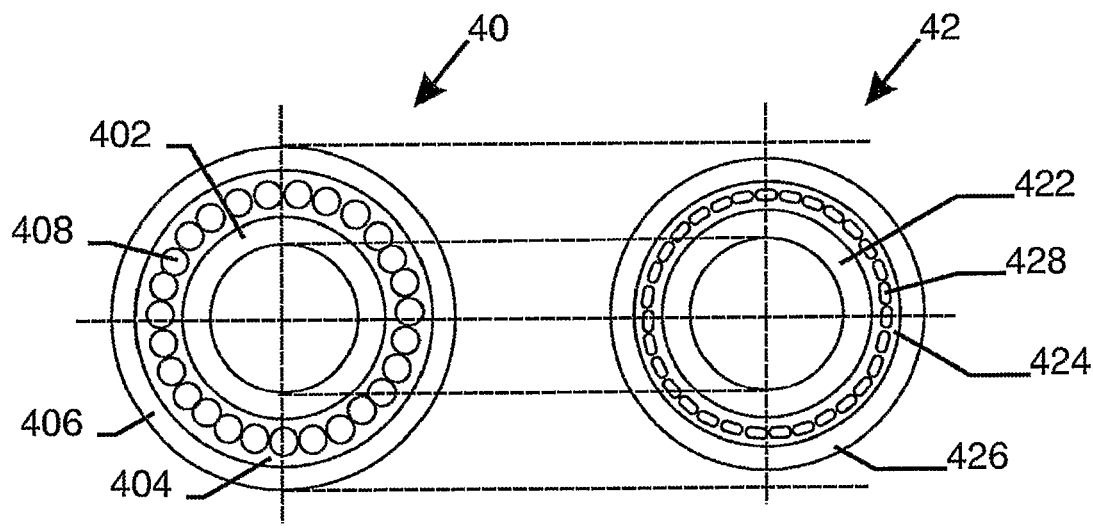
FIG. 4 compares a prior art hose with an invention hose.

FIG. 4 compares a prior art hose 40 with an invention hose 42. Both hoses have the same sequence of layers.

Prior art hose 40 has an inner liner 402, a single reinforcement layer 404 and a cover layer 406.

Invention hose 42 has an inner liner 422, a single reinforcement layer 424 and a cover layer 426.

The difference between the two layers lies in the type of reinforcement. Prior art hose 40 is reinforced by means of round steel wires with a diameter 0.56 mm, whereas invention hose 42 is reinforced by means of flattened steel wires with a thickness t of 0.310 mm and a width w of 0.853 mm. Table 2 hereunder mentions the thicknesses of the various layers and of the accumulated diameters.

TABLE 2

| | Prior art hose | | Invention hose | |
|---|---|---|---|---|
| | Thickness (mm) | Accumulated diameter (mm) | Thickness (mm) | Accumulated diameter (mm) |
| Inner diameter | 9.525 | 9.525 | 9.525 | 9.525 |
| Inner liner | 2 × 1.5 | 12.525 | 2 × 1.5 | 15.525 |
| Reinforcement layer | 2 × 4 × 0.37 | 15.485 | 2 × 4 × 031 | 15.005 |
| Cover layer | 1.2 | 17.885 | 1.2 | 17.405 |

It can be derived from Table 2 that the reinforcement layer of an invention hose has a decreased thickness due to the use of flattened steel wires. This decreased thickness in reinforcement layer leads to a reduced outer diameter of the hose and to a reduced amount of rubber. In the case of Table 2 a reduction in amount of rubber of about 3% has been obtained.

The invention claimed is:

1. A flexible hose or pipe reinforced by means of at least one flattened steel wire with natural edges,
   said steel wire having
   a thickness-to-width ratio t/w below 0.95,
   a tensile strength $R_m$ exceeding 3500–2000×d, where d is the diameter of a circle having the same cross-sectional surface and where $R_m$ is expressed in MPa,
   a permanent elongation at maximum load $A_g$ of at least 0.70%.

2. A flexible hose or pipe as claimed in claim 1, wherein said tensile strength $R_m$ exceeds 4300–2000×d.

3. A flexible hose or pipe as claimed in claim 1, wherein said thickness-to-width ratio t/w is below 0.90.

4. A flexible hose or pipe as claimed in claim 1, wherein said at least one steel wire is wound helically to form a spiraled hose or pipe.

5. A flexible hose or pipe as claimed in claim 1, wherein more than one steel wire is provided.

6. A flexible hose or pipe as claimed in claim 5, wherein said more than one steel wire is braided to form a braided hose or pipe.

* * * * *